Figure 1:
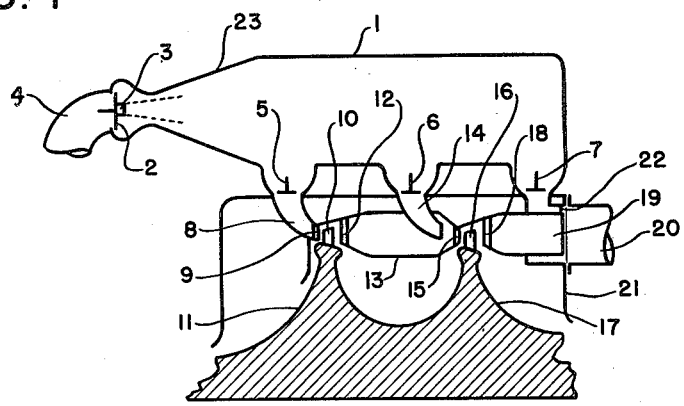

Feb. 26, 1957　　　A. H. SCHILLING　　　2,782,594
APPARATUS FOR GENERATING COMBUSTION GASES UNDER PRESSURE
Filed Oct. 24, 1951　　　　　　　　　　　　　　　2 Sheets-Sheet 1

INVENTOR.
August H. Schilling
ATTORNEY

United States Patent Office 2,782,594
Patented Feb. 26, 1957

2,782,594

APPARATUS FOR GENERATING COMBUSTION GASES UNDER PRESSURE

August H. Schilling, Atherton, Calif., assignor to Schilling Estate Company, San Francisco, Calif., a corporation of California Application December 24, 1951, Serial No. 263,117

8 Claims. (Cl. 60—39.16)

The present invention relates to apparatus for generating and delivering combustion gases under pressure for use in various kinds of engines and apparatus, and wherein the gases are generated by combustion in constant volume explosion chambers, the higher pressure range of the gases being utilized in an explosion turbine plant employed to drive the charging devices for the explosion chambers and, if desired, also their control mechanisms.

The invention relates in particular to explosion turbine plants having a plurality of constant volume explosion chambers whose working cycles are displaced with respect to each other and which are each provided with a plurality of nozzle valves or equivalent discharge mechanisms whereby the mass of explosion gases which is discharged from each chamber following each explosion, at a pressure above the charging air pressure (which is substantially the same as the pressure of the residual combustion gases which, in the preferred method of operation of the explosion chambers, are expelled by the incoming charging air), is divided into a plurality of portions which are charged into a plurality of nozzle and blading aggregates in such manner that a lower pressure portion of one chamber is caused to provide a counterpressure for the gas portion of higher pressure from another chamber so that these pressures fall or fluctuate in synchronism and with similar characteristic.

It is the general object of the present invention to provide improved explosion turbine plants of the type indicated, wherein the initial pressure of the intermediate gas portion or portions is so chosen that in each case it is no higher than that determined by a certain critical pressure relationship discovered by me, whereby Laval nozzles may be utilized for impinging the rotor blading and the efficiency of the explosion turbine plant thereby increased.

It is a further object of the invention to provide improved explosion turbine plants suitable especially for the drive of aircraft and other vehicles whereby unusually high outputs per unit of weight and of space can be obtained, while at the same time reliability and stability of operation for the required periods of time are secured.

A still further object of the invention is to provide an explosion turbine plant capable of operating with high cycle frequency and correspondingly high output, and at the same time possessing a high over-all efficiency unaided by utilization of the waste heat withdrawn by the cooling agent or agents from the various parts of the plant, or of the sensible heat contained in the pressure gases exhausting from the plant and conducted to a further place of use.

Other objects and advantages of the invention will appear from the following detailed description thereof.

The above-defined and other objects of the invention are achieved by the combination of a number of features described herein below whereby the occurrence of dangerously high temperatures is avoided and the construction of the plant simplified and its cost reduced by the preferred elimination of heat exchangers at different parts of the plant.

According to more recent advances described in a number of pending patent applications (see, for example, my application Serial No. 263,113, filed December 24, 1951, and entitled "Apparatus for the Generation of Driving Gases by Explosion and Process for Operating the Same" —Case 4901), the method of discharge from the explosion chambers is modified over prior methods of operating explosion turbine plants in that the high pressure explosion gases which are caused to do work in the plant are discharged from each chamber in separate portions, so that a plurality of combustion gas portions are discharged from each chamber which all have at the initial instant of discharge a pressure above the charging air pressure, which is substantially the pressure of the residual combustion gases at the moment of discharge from the chamber. There is obtained in this way a striking advance in explosion turbine technology, because it has thereby become possible to bring the lower pressure combustion gas portion of any chamber to expansion behind the nozzle and blading system which is being at the same time impinged by the combustion gas portion of higher initial pressure at the instant of its discharge from another explosion chamber. As there is involved in both cases an expansion, the pressure drops which occur or are effected in this way in advance of and behind the blading systems possess the same characteristic. As it is possible further, by displacement of the working cycles of the associated explosion chambers, to synchronize these impinging and counterpressure courses, there is available with this measure an extremely simple means of providing the bladings with practically uniform energy drops.

This is of most important influence on the constructional possibilities and efficiency of the blading. Heretofore it was necessary, by reason of the strongly fluctuating drops resulting from the fact that the fall of pressure occurred only on one side of the blading, while the counterpressure, in the best of cases, remained constant, but in practical constructions even increased in consequence of the finite size of the pressure equalizing space, there were wide variations in the energy of the gases (enthalpy drops), resulting in continuous variation in the gas speed; hence the $$\frac{u}{c}$$

ratio of the rotor was incorrect most of the time. It was further necessary to construct the turbine (Curtis) wheels with two rings of blades, so that fixed guiding or reversing blades had to be arranged which caused operational difficulties by reason of the fact that, being stationary, they did not experience the pauses between impingements which the rotating blades enjoyed. With the above-mentioned simple measures it has now become possible to solve these and other difficulties with one stroke. For the individual drops can now be so apportioned that they can be utilized in single-ringed rotors whose circumferential speeds amount to more than 250 m./sec., preferably about 300 m./sec., so that rotor efficiencies between 75 and 85% can be realized. The bladings of these wheels can be completely screened up to the nozzle outlets, leaving out of account the openings necessary for further conducting the gases, so that the ventilation or windage losses are correspondingly small which otherwise could become very large in the case of comparatively small drops and relatively high rotor chamber pressures. Moreover, in the case of single-ringed rotors, guiding or reversing blades are eliminated together with their rather difficult cooling. Also, nozzle assemblies in the upper portion of the housing are completely eliminated, so that the upper turbine housing half can be constructed as a simple container cover.

I have found that still further improved results are obtained with the process and apparatus of the type above discussed, especially from the efficiency standpoint, if special consideration is given to the constructional parts which participate in the conduction of the gases. Among these constructional parts the nozzles are of primary importance. The present invention is concerned with the problem of utilizing Laval nozzles, because in such nozzles the gas flow conditions in the ante-chamber in advance of the narrowest nozzle cross-section are not disturbed by downstream events as long as the pressure ratio across the nozzles (inlet pressure divided by discharge pressure) is equal to or greater than the critical pressure ratio. As this circumstance is of decisive significance, especially in explosion turbines, for the obtainment of the highest nozzle efficiency, the final discovery upon which the present invention is based is of outstanding importance, namely, that it is possible, by a definite apportionment of the pressures at which the combustion gas portions stand at the instants of discharge from the chamber, to make use of Laval nozzles, despite the fact that simultaneously the further condition, already touched on above, is to be observed that the individual drops simultaneously determined by the choice of these withdrawal pressures have values with which single-ringed rotors with circumferential speeds of over 250 m./sec. can be realized.

The solution of the technical problem presented above is characterized in accordance with the invention by conducting the process in such a manner that the initial pressure of the live combustion gas portions following the first portion (but other than the charging air-scavenged residual gas portion) is caused to assume a value determined by an equation defined hereinafter. With such fixing of the withdrawal pressures, which operate as counterpressures with respect to the impingement pressures in the anteriorly arranged nozzle and blading system, these counterpressures become smaller than the critical pressure, whereby the possibility is created for the advantageous utilization of Laval nozzles.

In accordance with a further feature of the present invention, and to secure certain advantages hereinafter explained, a limitation is placed on the pressure increase allowed to take place in the constant volume explosion chambers, while at the same time an improved method of utilizing the explosion gases in two or more explosion gas turbine stages is provided, whereby high efficiency and high output per explosion chamber are attained without excessive temperature or other stresses on the various parts of the plant.

According to this further feature of the invention, the permissible pressure increase in the explosion chambers forming part of a plant of the type indicated is caused to fall within a ratio of 4 to 5.5:1 in relation to the pressure of the ignitable charge at the moment of ignition; in other words, the explosion pressure $p_1$ is made to fall within the range of 4 to 5.5 times the pressure $p_0$ of the ignitable charge at the instant of ignition, such pressure $p_0$ being substantially equal to the air charging pressure, which preferably has a minimum value of about 3.5 atmospheres absolute (at. a.).

This preferred range of pressure rise ratios is considerably lower than the pressure ratios theoretically attainable with various types of fuel, as can be seen from the following table, which assumes a pre-ignition temperature of 0° C.:

| | |
|---|---|
| Blast furnace gas | 7.5 |
| Coke oven gas | 9.5 |
| Benzol | 11.0 |
| Gas oil | 11.7 |
| Heating oil | 11.7 |
| Anthracite coal tar oil | 11.5 |
| Coal dust (anthracite coal) | 11.2 |
| Coal dust (brown coal or lignite) | 9.7 |

I have found that improved operation of the gas generating plant can be secured if the excess of air for any particular fuel is so chosen that the pressure ratio $p_1:p_0$ falls within the limits of 4 to 5.5:1 despite the fact that this pressure increase is much less than is theoretically and practically attainable. I have found further that even though the maximum explosion temperatures appear only for extremely short intervals of time, of the order of several thousandths of a second, maximum over-all efficiency combined with high output and reliability of operation can be obtained by operating the chambers at a reduced range of pressure increase on explosion. This is contrary to the prior teachings in this art wherein it was assumed that maximum explosion pressures were necessary in order, by the expansion of the gases, to reduce their temperature sufficiently to prevent rapid destruction of the rotor and particularly of the stationary reversing blades and of the nozzles. By the present invention, the need for a higher degree of cooling of the gases by expansion is eliminated or greatly reduced by lowering of the explosion temperature, while at the same time greater efficiency and reliability of the process as a whole are insured, as will be explained hereinbelow.

Figure 2:
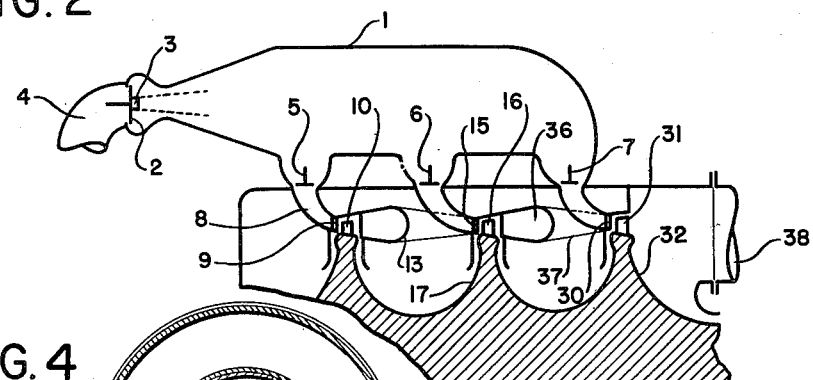
Figure 4:
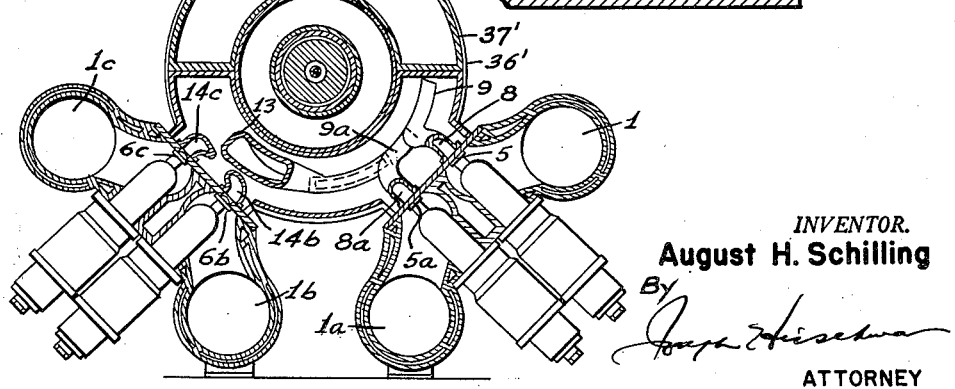
Figure 3:
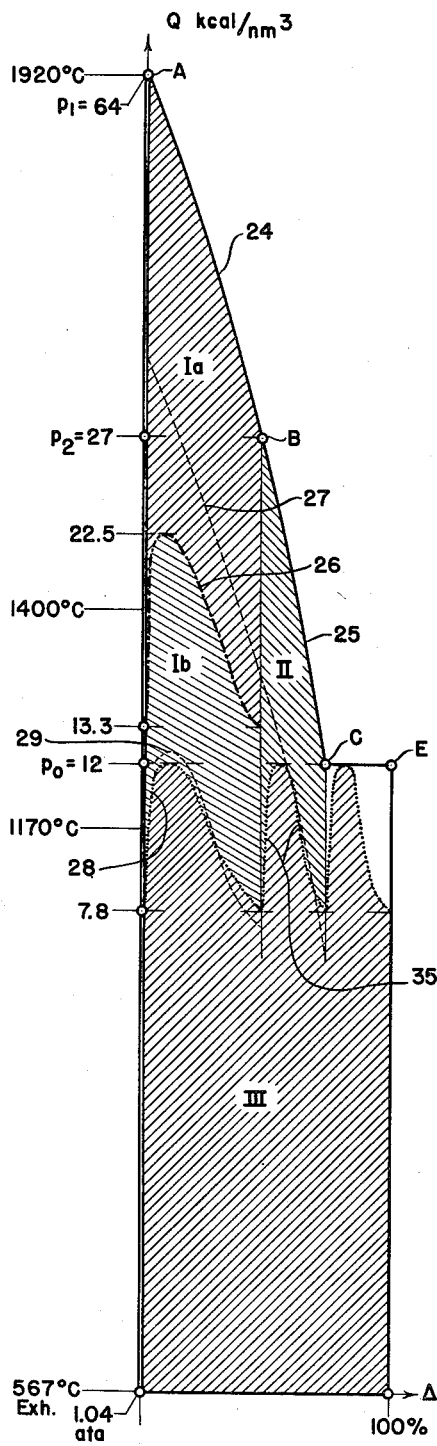

On the accompanying drawings there are shown the conditions resulting in the carrying out of the process pursuant to the present invention, the same being illustrated in connection with an oil-driven gas generator with two-fold partial expansion, that is, with the value of $n=2$, there being counted as partial expansions only those expansions whose initial pressure is above the air charging pressure. In said drawings, Fig. 1 shows schematically a longitudinal section through the driving gas generator with two-fold division of the expansion and two turbine stages;

Fig. 2 is a similar view showing a driving gas generator with two divisions of the expansion and three turbine stages;

Fig. 3 presents the Q—V diagram corresponding to the constructional example according to Fig. 1; while Fig. 4 illustrates a plant with a plurality of explosion chambers.

In the constructional example according to Fig. 1, the reference chacter 1 indicates one of the explosion chambers which are associated with the same nozzle and blading system. The explosion chamber is provided in the usual manner with an air inlet member 2 and with a fuel injection valve 3 built into the same. The charging air feed conduit is shown at 4, while the fuel pump and fuel supply conduits are not illustrated, the same being known and being constructed in the usual manner. Each explosion chamber is equipped with two nozzle valves 5 and 6 and likewise with an outlet valve 7 for the residual combustion gases. The combustion gas portion discharged through the nozzle valve 5 is conducted by way of the nozzle antechamber 8 to the nozzle asembly 9, which is arranged in advance of the single-ringed blading 10 of the rotor 11 of the first turbine stage. A catch nozzle arrangement 12 catches the combustion gases which have been partially de-energized in the first turbine stage 9, 10, 11 and conducts them to a collector chamber 13, disposed between the turbine stages and within the turbine housing. In to the collector chamber 12 there debouches conduit 14 which are connected to the nozzle valve 6. The collector chamber passes over at 15 into a second nozzle arrangement which is disposed in advance of the single-ringed blading 16 of the rotor 17 of the second turbine stage. A catch nozzle arrangement 18 receives the gases exhausting from the second turbine stage 15, 16, 17 and conducts them to the driving gas withdrawal conduit 20 by way of the tube 19. In the plane of connection of the withdrawal conduit 20 to the turbine housing 21, there discharges a further conduit 22, which receives the combustion gas residue discharged by the outlet valve 7.

The generation of the combustion gases is effected in the following manner: Upon simultaneous opening of the air charging valve 2 and outlet valve 7, the entering charging air, by reason of the venturi nozzle-like construction of the inlet end of the explosion chamber and the gradual slope of the diffuser 23 of said inlet end, assumes the form of a piston which pushes before it the residual combustion gases which still fill the chamber 1 from the previous explosion, and through the opened outlet valve 7. Shortly before the termination of this residual gas displacement and air charging section of a working cycle, the associated plunger of the fuel pump performs its feed stroke, and sprays the required quantity of fuel through the valve 3 into the body of air which is still in motion. In this way, there is formed a homogeneous, highly ignitable charge at the instant in which the valves 2 and 7 close. A not-illustrated ignition device effects the ignition of the mixture, so that the explosion occurs while all of the valves are completely closed. At the instant of formation of the highest explosion pressure, the nozzle valve 5 is opened and discharges a combustion gas portion whose initial condition is characterized by this maximum explosion pressure. Simultaneously there is opened the nozzle valve 6 of another explosion chamber which discharges a lower pressure combustion gas portion into the collector chamber 13, since its working cycle is advanced with respect to the chamber under consideration to such a degree that it has already discharged the combustion gas portion of initial condition corresponding to the maximum explosion pressure, that is, its nozzle valve 5 is closed and its nozzle valve 6 is opened when the nozzle valve 5 of the chamber under consideration has just opened.

In advance of the nozzle and blading system 9, 10, 11 of the first turbine stage, therefore, there appear the impingement pressures of the first partial expansion to which a portion of the total quantity of gas generated in the chamber 1 is subjected in the nozzle and blading system in question. Behind the same nozzle and blading system, viewed in the direction of gas flow, there occur the counterpressures which are developed in the collector chamber 13 by the fact that the latter receives, first of all, combustion gases discharged directly from the above-mentioned other explosion chamber by way of its conduit 14; and secondly, it receives combustion gases from the first turbine stage by way of the catch nozzle arrangement 12. Under the influence of these two streams of gases, the collector chamber 13 fills up very rapidly, favored by its small volume, so that the above-mentioned counterpressure formation takes place. This counterpressure formation has, however, the character of a partial expansion since the collector chamber 13 is in open communication with the second turbine stage 15, 16, 17 by way of the nozzle assembly 15. Since the working cycle displacement above referred to leads to synchronism between the two partial expansions, the lines characterizing the courses of the expansion and counterpressure in a pressure-time or a Q—V diagram must run approximately equidistant, as will be further explained in connection with Fig. 3. To this equidistance there correspond practically constant enthalpy drops to which the blading 10 is subjected, so that this first turbine stage is able to operate with high rotor efficiency.

What has been said above in connection with the first turbine stage applies naturally also to the second turbine stage 15, 16, 17. For in advance of this turbine stage, again viewed in the direction of gas flow, there is disposed the nozzle assembly 15 which is supplied with combustion gases from the collector chamber 13. These combustion gases produce an internal pressure whose effects have just been considered as a counterpressure in relation to the anteriorly arranged first turbine stage 9, 10, 11; the same internal pressures now become impingement pressures in relation to the second turbine stage 15, 16, 17 arranged subsequently in the gas stream, so that these impingement pressures again have the character of a partial expansion. While this partial expansion proceeds, a third chamber, not hitherto considered, opens its outlet valve 7. Through such valve the residual combustion gases contained in this chamber are being displaced during the charging process by the simultaneously entering compressed charging air. These residual gases reach the mouth of the driving gas withdrawal conduit and simultaneously experience a drop in pressure corresponding to the volume and pressure conditions. This pressure drop operates through the conduit section 19 as a counterpressure course which falls in pressure and acts on the preceding blading 16, so that the impingement pressures of the nozzle 15 and the counterpressures of the rotor chamber of wheel 17 again have the common and similar character of a partial expansion. By reason of the still greater advance of the working cycle of the third chamber, which is then carrying out the charging section of its working cycle, while the chamber 1 discharges its combustion gas portion of initially maximum pressure, and the second chamber discharges a portion of lower initial pressure, synchronism occurs between the counterpressure course produced by the residual gases and the partial expansion which is assigned to the second turbine stage, so that in the diagram above referred to there is again provided for practical equidistance between the partial expansion and the counterpressure course. In consequence, there occur also in the second turbine stage approximately constant enthalpy drops, so that also this turbine stage is able to operate with high rotor efficiency.

Up to this point the construction has followed that described in the aforementioned co-pending applications. The features constituting the present invention will now be described.

The practical realization of the inventive idea is shown in the Q—V diagram of the explosion chamber 1 in Fig. 3 and to scale. In this Q—V diagram, which combines the usual Q—S (entropy) diagram, for example according to Pflaum, with the percent of discharged combustion gas quantities as abscissae, the total gas quantity per explosion and chamber being considered as 100%, the ordinates corresponding to the heat content of the combustion gases in kcal./mm.$^3$ (enthalpy), there will be recognized, first of all, the indicated pressure and temperature line network which is valid only for the double line proceeding from the point A and which indicates the adiabatic combustion gas drop. This double line represents the changes of condition during the expansions. These changes appear in the Q—S or Q—V diagram as vertical adiabatic lines, but only in the ideal machine, in which no change of entropy appears during the expansion, that is, no heat is lost to the walls and no heat is absorbed from the friction heat of the rotors and blades. In the practical machine, however, both of these phenomena occur. Careful investigations on the heat interchange at the walls on the part of the combustion gases, and calculations of the ventilation or windage losses of the wheels and blades show that in carefully designed plants the methods of operation which from the practical standpoint come chiefly into consideration, there is approximate equality between the heat developed by friction and windage and the heat absorbed by the coolant. It is, therefore, substantially correct to assume that the changes in combustion gas conditions during the expansions are adiabatic changes in condition also for the practical machine, and these appear in the Q—S or Q—V diagram as vertical lines.

The point A corresponds to the initial condition of the combustion gas portion discharged through the nozzle valve 5, that is, considered from the standpoint of the pressure, to the maximum explosion pressure, which in the example illustrated is about 64 atmospheres absolute (at. a.). This portion of initial condition A is now subjected in the nozzle and blading system 9, 10, 11 of the first turbine stage to a partial expansion 24 which extends to the point B. At this point B the nozzle valve 5 closes and the nozzle valve 6 opens. The gas portion so discharged and of initial condition B undergoes a partial expansion whose course is characterized by the expansion line section 25. At the point C the nozzle valve 6 closes and the outlet valve 7 opens. The charging air entering simultaneously through the opened air valve pushes out the combustion gas residue until the point E is reached, at which instant the outlet valve 7 and air charging valve 2 close. Hereupon there follows the working cycle section of ignition and explosion which cannot be represented in a Q—V diagram and which leads to the production of a mass of combustion gases of initial condition A. The described working cycle is then repeated.

It is thus to be observed that the Q—V diagram of Fig. 3 extends in time, so that synchronously occurring events can be visualized in it only by reconstruction or imagined displacements of parts of the diagram.

In the explanation of the diagram it has been necessary to assume a position for the point B without, however, definitely fixing it on the expansion line A—C. The determination of the position of the point B is the crux of the present invention. According to the invention, the position of point B on the expansion line A—C is so determined that the withdrawal pressure of the lower pressure combustion gas portion which is discharged by the nozzle valve 6 (or any additional nozzle valves discharging gases of an initial pressure above that of the residual gases) is of such magnitude in relation to the pressure in the preceding nozzle and turbine aggregate, that two conditions are satisfied. The first condition, namely, that the individual drops, which are illustrated by the distance between the expansion and counterpressure lines, be so determined that single-ringed rotors with circumferential velocities over 250 m./sec. can be employed, is satisfied by the method of operation described in the co-pending application of Hans Holzwarth and August H. Schilling, Serial No. 263,116, filed December 24, 1951, and entitled "Explosion Turbine Plant and Process for Operating Same," in that there is assigned to the point B, with sole regard to this requirement, the position at which the desired individual drops arise. If the point B is shifted in the direction toward point A, then the individual drops in the first turbine stage diminish and the individual drops in the second turbine stage increase; on the other hand, if the point B is shifted toward point C, the individual drops in the first turbine stage increase while those of the second turbine stage decrease. The maintenance of this first condition is observed in the practice of the present invention.

According to the present invention there is provided the basis for fulfilling a further condition, that is, the second condition above referred to, to the effect that the plant is so constructed and operated in such manner that all the nozzles, both the nozzles 9 as well as the nozzles 15 are in the form of Laval nozzles. The present invention makes this possible without disturbing the fulfillment of the first condition. I have found that to obtain the results just described, the plant must be so operated that with $n$ portions of the generated total quantity of combustion gases (of a pressure above the residual gas pressure) per explosion and per chamber, the initial withdrawal pressure of the combustion gas portions is substantially equal to the product of the charging air pressure $p_0$ and the $$\frac{n+1-a}{n}$$

power of the quotient of the pressure $p_1$ at which the initial expansion out of combustion chamber begins, and the charging air pressure, "$a$" being the chronological serial number of the expansion; that is $$p_w = \text{approximately } p_0\left(\frac{p_1}{p_0}\right)^{\frac{n+1-a}{n}}$$

Since $n$ in the case of the constructional example under consideration has the value 2, and "$a$" for the second expansion likewise has the value 2, this means that the withdrawal pressure $p_w$ of the portion to be discharged from the explosion chamber by way of the nozzle valve 6, and which fixes the position of the point B, is substantially determined by the equation $$p_w = p_0\left(\frac{p_1}{p_0}\right)^{\frac{1}{2}} = p_0\sqrt{\frac{p_1}{p_0}}$$

As in the case of the constructional example $p_1=64$ at. a., and $p_0=12$ at. a., then $p_2$ is equal approximately to $$12\sqrt{\frac{64}{12}}$$

or 27.7 at. a. As can be seen from Fig. 3, the position of the point B corresponds to this intermediate pressure. The counterpressure course which sets in in the collector chamber 13 upon the basis of this withdrawal pressure is represented by the dot-and-dash line 26. It will be seen that the line 26 runs approximately equidistant to the line 24 except for the short filling phase at its beginning. In the first turbine stage the gas portion of initial condition A discharged by the nozzle valve 5 thus experiences practically uniform partial drops, so that the blading 10 operates with high rotor efficiency. At the same time, the rotor can be constructed with a single row of blades and can be driven at circumferential speeds of over 250 m./sec., preferably at above 300 m./sec., as the individual drops determined by the position of the counterpressure line 26 in relation to the expansion line 24 permit this.

There is, however, further to be observed the fact that the second condition posed to the invention is satisfied. Reference is had to the line 27 which represents the line of critical pressure in relation to the expansion lines 24, 25. The counterpressure line 26 lies clearly recognizably below this line 27 of critical pressure, so that in the first turbine stage, Laval nozzles with the described favorable properties can be utilized, these very properties being desirable and decisive for the operation of explosion turbines at maximum efficiencies.

What has been said hereinabove in connection with the first turbine stage applies also to the second turbine stage. To illustrate this, there is shown in dotted lines at 28 the counterpressure arising in the second rotor chamber. This line 28 runs approximately equidistantly to the line 26 which now represents the changes of the impinging pressures which arise in relation to the second turbine stage 15, 16, 17. Also the second turbine stage thus utilizes practically constant individual drops. The position of the line 28 in relation to the line 26, in other words, the individual drops in the second turbine stage, insofar as they concern the utilization of the combustion gas portion which was discharged from the first turbine stage by way of the catch nozzle arrangement 12, is or are so determined that in the second turbine stage single-ringed rotors can again be employed with the above-mentioned circumferential speeds.

There is shown on the drawing also the line 29 of the critical pressure in relation to the impingement pressure, represented by the line 26. It will be seen that the line 28 lies below the line 29 for the larger part of its course. Such slight rise as occurs above the critical pressure does not alter the known advantage of Laval nozzles of guiding the combustion gas stream in the desired direction without deflection and without corresponding fall of efficiency. The Laval nozzle becomes dangerous only with great widening or with too great an expansion angle; only then does the stream separate itself from the guiding wall and expand further in the gap in uncontrollable direction.

The diagram of Fig. 3 shows finally that also the counterpressure course depicted by the dotted line 35, in relation to the combustion gas portion discharged into the collector chamber 13 by way of the nozzle valve 6 and which thus possessed the initial condition B and expanded corresponding to the expansion line section 25, lies essentially below the line 27 of the critical pressure in relation to the impingement pressures B to C. Regardless, therefore, of whether special nozzles are provided for the combustion gas portion conducted by the conduit section 14, or whether this combustion gas portion flows into a common nozzle assembly 15, common in relation to the combustion gas portion of original condition A and flowing thereto by way of the catch nozzle 12, there exists thus the possibility of constructing both nozzle structures, and particularly the common nozzle 15 of the second turbine stage, as Laval nozzles.

It may also be mentioned that area Ia represents the available working capacity of the combustion gas portion of initial condition A in the first turbine stage, while the area Ib represents the working capacity of the same gas portion in the second turbine stage. The area II represents the available working capacity of the combustion gas portion of initial condition B in the second turbine stage, such gas portion being that discharged by the nozzle valve 6, while the area III, finally, is a measure of the working capacity of the combustion gases which enter the mouth of the driving gas withdrawal conduit 20.

What has been said for a value $n=2$, that is for a twofold subdivision of the expansion, naturally applies also for higher integral values of $n$. If $n$ were, for example, 3, then in accordance with the invention the withdrawal pressure $p_3$ of the lowest pressure combustion gas portion is represented by the following:

$$p_3 = \text{approximately } p_0\left(\frac{p_1}{p_0}\right)^{\frac{1}{3}} \text{ or } p_0\sqrt[3]{\frac{p_1}{p_0}}$$

since $a$ would likewise have the value 3. Utilizing the pressure values given above, there results the following:

$$p_3 = \text{approximately } 12\sqrt[3]{\frac{64}{12}} \text{ or 21 at. a.}$$

The next higher pressure combustion gas portion of initial pressure $p_2$ would have the value 2 for $a$, so that $$p_2 = \text{approximately } p_0\left(\frac{p_1}{p_0}\right)^{\frac{2}{3}} \text{ or } p_0\sqrt[3]{\left(\frac{p_1}{p_0}\right)^2}$$

that is, with the pressure values given above, $$p = \text{approximately } 12\sqrt[3]{\left(\frac{64}{12}\right)^2} \text{ or 36.7 at. a.}$$

The embodiment of the invention according to Fig. 2 corresponds to that of Fig. 1 with the difference that in the path of the combustion gas residue discharge through the outlet valve 7 there is disposed a nozzle assembly 30 by which the blading 31 of a third wheel 32 is impinged. The nozzle arrangement 30, however, receives not only the gas residue discharge by way of the outlet valve 7, but also combustion gases which have performed work in the preceding turbine stage 15, 16, 17. These gases flow first into a collector chamber 36 which is in communication with the nozzle assembly 30 at 37. In this way the fluctuating counterpressure course developed in the exhaust housing section 38 of the third turbine stage 30, 31, 32, and characterized by the line 35 in Fig. 3, comes into action in relation to the partial expansion 25 in the second turbine stage 15, 16, 17. The resulting effect is evidenced by the approximately equidistant course of the line 35 in relation to the expansion line section 25 from the moment of completion of the filling phase, indicated by the left, rising portion of the curve 35. In other words, the arrangement of the third turbine stage 30, 31, 32 in Fig. 2 changes nothing as regards the occurrence of practically uniform drops in the first turbine stage 9, 10, 11, and obviously just as little as regards the occurrence of practically uniform drops in the second turbine stage 15, 16, 17. Furthermore, the line 35 almost coincides in the range of area II with the line 27 of critical pressure, so that the third turbine stage to be provided according to Fig. 2 for utilizing the energy drop contained in the residual gases again has no unfavorable or disturbing reaction on the possibility of utilization of Laval nozzles in the two preceding stages. The invention can therefore be realized also in the embodiment according to Fig. 2.

Fig. 4 shows a section through an explosion gas turbine plant provided with four explosion chambers 1, 1a, 1b, and 1c, the section being taken through the nozzle valve 5 of chambers 1 and 1a and through the nozzle valve 6 of chambers 1b and 1c. The parts of chambers 1a, 1b, and 1c corresponding to those of chamber 1 are designated with the same reference numeral, but with the letter a, b, or c attached. As indicated hereinabove, all four chambers are below the horizontal diameter of the housing 36' of the turbine, the upper part 37' of the housing being constructed as a removable cover.

As already indicated, the present invention is concerned also with a process whereby high outputs can be obtained per unit of weight and space, which is of importance especially in aircraft engines and in other portable power plants. By the process of the present invention, it is possible to convert as much as $10^8$ kcal. per cubic meter of explosion or combustion space per hour into mechanical energy. To be able to convert approximately one hundred million of such heat units per cubic meter of explosion space per hour, the explosion turbine must be operated with a very high number of cycles per unit of time, that is, it must be operated with correspondingly high control shaft speeds in the same unit of time; in addition, high charging pressures $p_0$ and comparatively rich heat tones Q of the mixture must be employed. To reconcile this requirement with the necessary reliability of operation, that is, with a long working life of the constructional parts exposed to the high temperatures and heat transfers, I have found that the maximum temperature $t_1$ in the explosion chamber should not be allowed to exceed 1950° C., it being understood that in combination with the above-described preferred method of operation, there are employed the usual cooling means for the structural parts, while the parts which are subjected to stress are made of suitable building materials and are constructed in known manner. On the other hand, I have found it desirable to keep the maximum explosion temperatures from falling below 1400° C.

Combined with this temperature interval of 1950° C. to 1400° C. I employ the above-mentioned pressure increase $p_1:p_0$ of 4 to 5.5:1. According to the present invention, therefore, the mixture of the particular fuel employed and air is such that in the explosion chambers the ratio between the maximum explosion pressure $p_1$ and the charging pressure $p_0$ of the mixture is given a value of at least about 4:1 up to a maximum of about 5.5:1.

The above-described restricted range of pressure increase on explosion is advantageously employed together with certain improved procedures in the operation of explosion turbine plants, among which may be mentioned the values for $p_w$ discussed above and the charging process whose preferred form is characterized by the already mentioned simultaneous opening of the air-charging inlet members 2 and residual gas outlet members 7 of the explosion chambers. The displacement of the residual combustion gases effected in this way by the charging air which is admitted at the same pressure as such residual gases has, in contrast to the known process of post-charging of the chamber after closing of the air-charging valve and of the outlet member, the advantage that the time of a working cycle is shortened to an important degree by the time interval necessary for the postcharging, so that by this preferred charging process it is possible to realize a higher working cycle number per unit of time.

The above-mentioned high rotor and over-all efficiencies are of decisive influence for further simplifying the construction of the plant. They make it possible to eliminate the deliberate abstraction of heat from the gases outside of the explosion chambers and of the nozzle and blading systems (that is, externally of the explosion turbine plant) except for unavoidable losses in the cooling of structural parts; in other words, of dispensing with interstage cooling and with the utilization of the heat content of the gases discharged by the gas generator, in heat exchangers for conversion into mechanical work or for purely thermal use. Heat exchangers are bulky and heavy, so that their elimination reduces considerably the weight and space requirement of the plant. Accordingly, the indispensable cooling agents for the structural parts are withdrawn after taking up their cooling heat from the plant; that is, the utilization of the cooling heat is eliminated. Also, the exhaust gases, i. e., the spent gases exhausting from the apparatus charged by conduit 20 or 38 and located either in the same plant or elsewhere, are discharged with their sensible heat, so that even those devices are omitted which have heretofore been provided for utilizing this sensible heat in plants with rather low thermal efficiency in order to arrive at a satisfactory overall efficiency.

By the combined use of the above-described measures, the present invention has made it possible to meet all requirements of modern power plant technology within the named range of pressure increase, particularly those of portable power plants.

It will be apparent from the foregoing that proper control of the valves of the several explosion chambers is of critical importance for the successful carrying out of the above-described process. The proper timing of the valves can be effected by various types of hydraulic, mechanical and electrical devices, or combinations of these, their construction being well understood and therefore not being illustrated herein. Suitable devices of this type are shown, for example, in United States Patents Nos. 1,756,139, 1,763,154, 1,786,946, 1,933,385, 2,010,019, and 2,063,928.

I claim:

1. An explosion turbine plant for delivering partially deenergized explosion gases and comprising a plurality of explosion chambers, a plurality of nozzle and blading systems, said chambers being each provided with an air inlet valve and with gas discharge means leading at least in part to the nozzle and blading systems, and mechanism for controlling the gas discharge means to cause the gases generated by each explosion in a chamber to be discharged in a series of at least two portions each having an initial pressure above that of the charging air, said initial pressure being at the most equal to that determined by the equation:

$$p_w = \text{approximately } p_0 \left(\frac{p_1}{p_0}\right)^{\frac{n+1-a}{n}}$$

wherein $p_w$ = the initial withdrawal pressure of the individual gas portions;
$p_0$ = the charging air (or pre-ignition) pressure;
$p_1$ = the pressure at which initial expansion out of the chamber commences;
$n$ = the number of portions of combustion gases discharged by a chamber prior to the fall of the chamber pressure to the charging pressure; and
$a$ = the chronological serial number of the expansion.

2. An explosion turbine plant according to claim 1, wherein the gas discharge means comprises a plurality of nozzle valves one of which is connected to the first nozzle and blading system, and wherein another nozzle valve is connected with a second nozzle and blading system.

3. An explosion turbine plant according to claim 1, wherein the nozzles are Laval nozzles.

4. An explosion turbine plant according to claim 1, wherein the nozzles are Laval nozzles and wherein the blading systems include a plurality of rotors each having only a single ring of blades.

5. An explosion turbine plant according to claim 1, wherein each explosion chamber is provided with two successively opened nozzle valves, said control mechanism opening one nozzle valve while the other is closed, and opening the second nozzle valve upon closing of the first valve.

6. An explosion turbine plant according to claim 1, wherein each explosion chamber is provided with three successively opened nozzle valves, and including a nozzle and turbine blading system associated with each of said valves, said control mechanism opening and closing each nozzle valve before the next valve is opened.

7. An explosion plant for delivering partially deenergized explosion gases, comprising a plurality of explosion chambers, a plurality of nozzle and blading systems, said chambers being each provided with an air inlet valve, a fuel inlet valve, two nozzle valves connected to separate nozzle and blading systems, an outlet valve, and means for igniting a combustible mixture therein, and a valve control mechanism operating to open and close the nozzle and outlet valves of each chamber in succession, so that each such valve is open only when the others are closed, and opening the air inlet valve substantially simultaneously with the opening of the outlet valve.

8. An explosion turbine plant as defined in claim 7, including a nozzle and blading system connected also with the outlet valve.

References Cited in the file of this patent

UNITED STATES PATENTS

| | | |
|---|---|---|
| 1,964,731 | Holzwarth | July 3, 1934 |
| 1,969,753 | Holzwarth | Aug. 14, 1934 |
| 1,982,665 | Holzwarth | Dec. 4, 1934 |
| 1,988,456 | Lysholm | Jan. 22, 1935 |
| 2,010,823 | Noack | Aug. 13, 1935 |